(12) United States Patent
Maury et al.

(10) Patent No.: US 9,180,435 B2
(45) Date of Patent: Nov. 10, 2015

(54) PROCESS FOR THE PREPARATION OF A CATALYST USING A RAPID DRYING STAGE AND USE THEREOF FOR FISCHER-TROPSCH SYNTHESIS

(71) Applicants: ENI S.p.A., Rome (IT); IFP Energies nouvelles, Rueil-Malmaison Cedex (FR)

(72) Inventors: Sylvie Maury, Saint Maurice d'Argoire (FR); Fabrice Diehl, Lyons (FR); Adrien Berliet, Lyons (FR); Joseph Lopez, Saint Julien les Rosiers (FR)

(73) Assignees: ENI S.P.A., Roma (IT); IFP ENERGIES NOUVELLES, Rueil-Malmaison Cedex (FR)

( * ) Notice: Subject to any disclaimer, the term of this patent is extended or adjusted under 35 U.S.C. 154(b) by 50 days.

(21) Appl. No.: 13/903,010

(22) Filed: May 28, 2013

(65) Prior Publication Data

US 2013/0324623 A1 Dec. 5, 2013

(30) Foreign Application Priority Data

May 30, 2012 (FR) ..................................... 12 01543

(51) Int. Cl.
*B01J 21/00* (2006.01)
*B01J 21/04* (2006.01)
(Continued)

(52) U.S. Cl.
CPC ................ *B01J 23/75* (2013.01); *B01J 23/005* (2013.01); *B01J 23/462* (2013.01); *B01J 23/74* (2013.01);
(Continued)

(58) Field of Classification Search
CPC ............ B01J 21/08; B01J 21/12; B01J 23/46; B01J 23/74; B01J 23/745; B01J 23/75; B01J 23/755; B01J 23/89; B01J 23/8906; B01J 23/8913; B01J 23/892; B01J 37/02
USPC ................ 502/258–261, 263, 304, 327, 332, 502/335–338, 349, 355, 407, 415, 439
See application file for complete search history.

(56) References Cited

U.S. PATENT DOCUMENTS 4,139,493 A * 2/1979 Mickelson ...................... 502/11
4,160,745 A * 7/1979 Murrell et al. ................ 502/185
(Continued)

FOREIGN PATENT DOCUMENTS

| EP | 2407237 A1 | 1/2012 |
| WO | 03012008 A2 | 2/2003 |
| WO | 2012020210 A2 | 2/2012 |

OTHER PUBLICATIONS

Search Report from corresponding French Application No. 1201543 dated Nov. 28, 2012.

*Primary Examiner* — Cam N. Nguyen
(74) *Attorney, Agent, or Firm* — Millen, White, Zelano, Branigan, P.C.

(57) ABSTRACT

The present invention concerns a process for the preparation of a catalyst comprising an active phase comprising at least one metal from group VIII selected from cobalt, nickel, ruthenium and iron, alone or as a mixture, and an oxide support which can be used in a Fischer-Tropsch synthesis process comprises at least once the linked sequence of a stage for impregnation of said oxide support, a drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute, and a stage for calcination of said dried impregnated oxide support. The invention also concerns a Fischer-Tropsch synthesis process using the catalyst prepared according to the preparation process.

28 Claims, 3 Drawing Sheets

(51) Int. Cl.
  *B01J 23/00*    (2006.01)
  *B01J 23/02*    (2006.01)
  *B01J 23/10*    (2006.01)
  *B01J 23/40*    (2006.01)
  *B01J 23/42*    (2006.01)
  *B01J 23/56*    (2006.01)
  *B01J 23/70*    (2006.01)
  *B01J 23/74*    (2006.01)
  *B01J 20/00*    (2006.01)
  *B01J 23/75*    (2006.01)
  *C10G 2/00*     (2006.01)
  *B01J 37/18*    (2006.01)
  *B01J 37/02*    (2006.01)
  *B01J 23/46*    (2006.01)
  *B01J 35/00*    (2006.01)
  *B01J 37/08*    (2006.01)
  *B01J 23/745*   (2006.01)
  *B01J 23/755*   (2006.01)
  *B01J 35/10*    (2006.01)
  *B01J 21/06*    (2006.01)
  *B01J 21/12*    (2006.01)

(52) U.S. Cl.
  CPC .............. *B01J 23/745* (2013.01); *B01J 23/755* (2013.01); *B01J 35/002* (2013.01); *B01J 35/006* (2013.01); *B01J 35/0053* (2013.01); *B01J 35/1019* (2013.01); *B01J 35/1042* (2013.01); *B01J 37/0203* (2013.01); *B01J 37/0205* (2013.01); *B01J 37/0207* (2013.01); *B01J 37/08* (2013.01); *B01J 37/18* (2013.01); *C10G 2/332* (2013.01); *C10G 2/333* (2013.01); *B01J 21/04* (2013.01); *B01J 21/06* (2013.01); *B01J 21/12* (2013.01)

(56) References Cited

U.S. PATENT DOCUMENTS

| | | | | |
|---|---|---|---|---|
| 4,447,556 | A * | 5/1984 | O'Hara et al. | 502/74 |
| 4,497,704 | A * | 2/1985 | O'Hara et al. | 208/112 |
| 5,036,032 | A * | 7/1991 | Iglesia et al. | 502/260 |
| 5,168,091 | A * | 12/1992 | Behrmann et al. | 502/325 |
| 5,258,411 | A * | 11/1993 | Behrmann et al. | 518/715 |
| 6,806,226 | B2 * | 10/2004 | Van Berge et al. | 502/326 |
| 7,262,225 | B2 | 8/2007 | Van Berge et al. | |
| 7,341,976 | B2 | 3/2008 | Espinoza et al. | |
| 7,449,486 | B2 * | 11/2008 | Hans et al. | 514/363 |
| 7,449,496 | B2 | 11/2008 | Jin et al. | |
| 8,071,655 | B2 * | 12/2011 | Diehl et al. | 518/715 |
| 8,575,410 | B2 * | 11/2013 | Nicholas et al. | 585/324 |
| 8,630,528 | B2 * | 1/2014 | Kauffman et al. | 386/241 |
| 2003/0125201 | A1 * | 7/2003 | Van Berge et al. | 502/325 |
| 2004/0186188 | A1 | 9/2004 | Van Berge et al. | |
| 2005/0234137 | A1 | 10/2005 | Espinoza et al. | |
| 2008/0039539 | A1 | 2/2008 | Espinoza et al. | |
| 2009/0005242 | A1 * | 1/2009 | Krylova et al. | 502/327 |
| 2009/0270251 | A1 * | 10/2009 | Hagemeyer | 502/325 |
| 2012/0016042 | A1 | 1/2012 | Maury et al. | |

* cited by examiner

US 9,180,435 B2

PROCESS FOR THE PREPARATION OF A CATALYST USING A RAPID DRYING STAGE AND USE THEREOF FOR FISCHER-TROPSCH SYNTHESIS

TECHNICAL FIELD

The present invention concerns the field of catalysts used for reactions for the synthesis of hydrocarbons from a gas mixture comprising carbon monoxide and hydrogen, generally referred to as Fischer-Tropsch synthesis, and more particularly a process for the preparation of a catalyst comprising an active phase comprising at least one metal from group VIII, preferably cobalt, and an oxide support, preferably silica-alumina.

PRIOR ART

It is well known to the man skilled in the art that synthesis gas can be converted into hydrocarbons in the presence of a catalyst containing metals from group VIII of the periodic table of elements such as iron, ruthenium, cobalt and nickel which catalyze the transformation of a CO and H2 mixture referred to as synthesis gas (that is to say a mixture of carbon monoxide and hydrogen), possibly diluted with carbon dioxide or any other diluent alone or in the form of a mixture such as methane, nitrogen or ethane, into hydrocarbons which are solid, liquid or gaseous at ambient temperature. That process is known by the name of Fischer-Tropsch synthesis.

Different methods have been described and developed in the prior art to improve the preparation of Fischer-Tropsch catalysts based on cobalt supported by different supports. The most widely used supports being alumina, silica and titanium dioxide, sometimes modified by additional elements.

U.S. Pat. No. 6,806,226 describes by way of example cobalt-based catalysts. The cobalt-based Fischer-Tropsch catalysts described there suffer however from the disadvantage that they do not have a homogeneous cobalt distribution either in the catalyst grains or at the surface of the catalyst. The poor surface distribution of the cobalt occurs in the form of agglomeration and enrichment in cobalt at the surface and forms an external layer which is also referred to as the crust.

Indeed, when using catalyst in the form of particles of a granulometry of less than 500 μm in processes of slurry bubble column type homogeneous distribution and in particular the absence of crust is generally desirable. In fact, using a slurry process gives rise to a substantial mechanical stress for the catalyst, the distribution of the active metal in the form of a crust makes it more sensitive to attrition effects and may cause a loss of active metal with the passage of time. Excessively advanced aggregation of the metal at the periphery of the catalyst can also give rise to a loss in selectivity linked to stearic stresses (metal crystallites which are excessively aggregated together) limiting the growth of hydrocarbon chains and causing degradation of $C_{5+}$ selectivity (and consequently the probability of chain growth which is also referred to as alpha from the theoretical works of Anderson, Schulz and Flory which are well known to the man skilled in the art) in the hydrocarbon synthesis reaction.

The conventional procedures for preparation of catalysts used for Fischer-Tropsch synthesis generally comprise the following stages: impregnation of the support, drying, calcination and possible reduction.

A number of patents thus describe methods for the preparation of the catalysts used in Fischer-Tropsch synthesis, which are based on those conventional procedures and which aim to improve the distribution of cobalt in order to make it more homogeneous in the catalyst and to avoid the formation of a crust.

In recent years numerous authors have also shown that one of the key parameters governing catalytic performances was the production of catalysts having a size of crystallites of metal from group VIII and preferably cobalt which is an optimum and is preferably between 6 and 10 nm in dependence on the support used and the operating conditions.[1] There are many means available for controlling the size of those crystallites and the distribution in respect of size, it is indeed known to use different cobalt precursors (for example cobalt acetate), different additives (glycols ...), drying under vacuum or calcining in different atmospheres (calcination in $NO/O_2$, WO2007/071899 A1, in H2)[2]

[1] Bezemer et coll. Cobalt particle size effects in the Fischer-Tropsch reaction studied with carbon nanofiber supported cobalt, JACS 2006, 128, 3956
[2] Batholomew et coll, The stoechiometrics of H2 and CO adsorptions on cobalt: effects of support and preparation J Catal, 85, 63-77 (1984)

One of the ways of controlling the size, the size distribution of the crystallites and also their level of aggregation may involve optimizing the drying and calcination conditions.

U.S. Pat. No. 6,806,226 describes a catalyst obtained by vacuum impregnation and partial vacuum drying at a temperature of between 60° C. and 95° C., followed by calcination at a temperature of between 75° C. and 400° C. with a temperature ramp of between 0.5° C./min and 1° C./min for hourly space velocities (HSV) of at least 1 m³ of air/(Kg $Co(NO_3)_2$, $6H_2O$*h). That patent provides the possibility of much faster calcination with a temperature ramp of 100° C./min to eliminate nitrates if the HSV is higher.

The disadvantage of those procedures is that the catalyst still contains a great deal of water on issuing from the drying stage (partial drying is claimed) as all the water afforded by the impregnation operation is not removed. The presence of that water gives rise to the risk of disadvantaging homogeneous distribution of the cobalt in and at the surface of the catalyst.

Therefore the object of the present invention is to remedy one or more of the disadvantages of the prior art by proposing a process for the preparation of a catalyst comprising an active phase comprising at least one metal from group VIII selected from cobalt, nickel, ruthenium and iron, alone or as a mixture, and an oxide support which can be used in a Fischer-Tropsch synthesis process, having improved activity and selectivity which is maintained in respect of C5+ in the Fischer-Tropsch synthesis process due to better control of the mean size of the crystallites of elements from group VIII and a better distribution of the metal from group VIII in the interior of the catalyst grains and at the surface thereof, this causing a reduction in the quantity of cobalt present in the form of crust easily extracted from the catalyst by attrition.

In fact the applicant surprisingly discovered that a rapid drying stage under specific conditions made it possible to better control the mean size of crystallites of oxide of metal from group VIII and in particular cobalt oxide ($Co_3O_4$) and the level of aggregation thereof.

An object of the present invention is therefore to provide a process for the preparation of a catalyst which can be used in a Fischer-Tropsch synthesis process, said process, by virtue of the use of that specific rapid drying mode, permitting the production of catalyst having crystallites of elements of oxide from group VIII of a size which is better controlled and an improvement in the homogeneity of the metal from group VIII in and in particular at the surface of the catalyst by totally eliminating the crust present at the periphery of the catalyst grains.

Another object of the present invention is to provide a preparation process permitting the production of a catalyst which is highly active and selective in the Fischer-Tropsch synthesis process.

SUMMARY OF THE INVENTION

A subject of the present invention concerns a process for the preparation of a catalyst comprising an active phase comprising at least one metal from group VIII selected from cobalt, nickel, ruthenium and iron, alone or as a mixture, and an oxide support, which preparation process comprises at least once the linked sequence of the following stages:

a stage for impregnation of said oxide support, a drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute, and a stage for calcination of said impregnated and dried oxide support.

An advantage of the preparation process according to the invention is that it permits the production of catalyst which has a mean size of crystallites of metal from group VIII of less than 12 nm.

The attraction of the invention lies in the implementation of a specific drying stage, referred to as the rapid drying stage, which is independent of the calcination stage and carried out after the impregnation stage or each of the impregnation stages of the preparation process according to the invention. In fact, implementation of said drying stage makes it possible to avoid migration of the metal from group VIII and preferably cobalt at the surface of the grains of the support, which would form a crust, and also avoids the formation of aggregates of the metal from group VIII and preferably cobalt within the catalyst grains.

Thus said rapid drying stage performed prior to the calcination stage in the preparation process according to the invention permits both highly efficient drying and the avoidance of the formation of a crust of metal from group VIII and preferably cobalt at the surface of the particles of the catalyst prepared in that way, and thus permits an improvement in the distribution of the metal from group VIII and preferably cobalt within the catalyst particles.

Another subject of the present invention also concerns a process for Fischer-Tropsch synthesis from a mixture of carbon monoxide and hydrogen using a catalyst prepared according to the preparation process according to the invention, said Fischer-Tropsch synthesis process operating at a temperature of between 190 and 240° C., at a total pressure of between 1 and 5 MPa and with an $H_2/CO$ molar ratio of between 1.5 and 2.5.

DESCRIPTION OF THE INVENTION

Figure 1A:
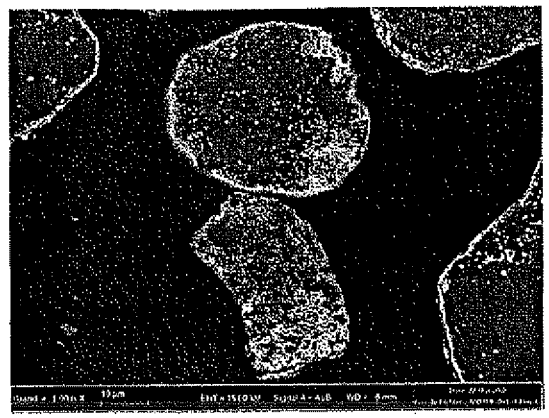
FIGS. 1A and 1B: Demonstrates the presence of crust (FIG. 1A) and a poor distribution of the cobalt within the catalyst grains (FIG. 1B) of comparative Example 1.

According to the invention the process for the preparation of a catalyst comprising an active phase comprising at least one metal from group VIII selected from cobalt, nickel, ruthenium and iron, alone or as a mixture, and an oxide support, said process comprising at least the linked sequence of the following stages:

a stage for impregnation of said oxide support, a drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute, and a stage for calcination of said impregnated and dried oxide support.

Hereinafter throughout the text the term drying is used to denote a heat treatment stage making it possible to obtain a solid with a loss on ignition (LOI) at 1000° C. of between 7 and 20% and not giving rise to the formation of crystallized cobalt oxide which can be detected by X-ray diffraction.

The term calcination is used to denote a heat treatment stage permitting total decomposition of the nitrates and transformation of all the counter-ions of metallic salts of the metal from group VIII (for example for cobalt, the precursor $Co(NO_3)_2$), to cobalt oxides.

According to the invention the catalyst prepared by the process of the invention comprises an active metallic phase comprising at least one metal from group VIII selected from cobalt, nickel, ruthenium and iron, alone or as a mixture. Very preferably the active phase comprises cobalt. The active phase is advantageously deposited on an oxide support. In the case where the active phase comprises at least one metal from group VIII selected from cobalt, nickel, ruthenium and iron, the content of metal from group VIII is advantageously between 1 and 60% by weight with respect to the weight of catalyst, preferably between 5 and 30% by weight with respect to the weight of the catalyst and very preferably between 10 and 30% by weight with respect to the weight of the catalyst. In the case where the active phase comprises ruthenium the metallic ruthenium content is between 0.01 and 10% by weight with respect to the weight of the catalyst and very preferably between 0.05 and 0.5% by weight with respect to the weight of the catalyst. The active phase of the catalyst prepared according to the process of the present invention also advantageously comprises at least one additional metal selected from platinum, palladium, rhenium, ruthenium, manganese and tantalum and very preferably selected from platinum, ruthenium and rhenium. The additional metal or metals is or are preferably present in a content of from 0.01 to 2% by weight, preferably 0.02 to 0.3% by weight of metal with respect to the weight of the catalyst.

The oxide support of the catalyst prepared by the process according to the invention, on which the active phase is deposited, is advantageously selected from simple oxides and preferably from alumina ($Al_2O_3$), silica ($SiO_2$), titanium oxide ($TiO_2$), ceric oxide ($CeO_2$) and zirconia ($ZrO_2$). That oxide support can also advantageously comprise a plurality of simple oxides selected from alumina ($Al_2O_3$), silica ($SiO_2$), titanium oxide ($TiO_2$), ceric oxide ($CeO_2$) and zirconia ($ZrO_2$). Preferably the oxide support of the catalyst prepared by the process according to the invention comprises silica and alumina. Very preferably the oxide support is formed by silica-alumina. In that case the support formed by silica-alumina preferably comprises 1 to 30% by weight of silica with respect to the total weight of the support. The silica-alumina is homogeneous on the micrometer scale, preferably homogeneous on the nanometer scale.

According to the invention the linked sequence of the impregnation, drying and calcination stages is performed at least once.

Preferably the linked sequence of the impregnation, drying and calcination stages is performed in that order.

The number of linked sequences depending on the desired final content of the element from group VIII and the initial pore volume of the oxide support used, said linked sequence of stages can be performed as many times as necessary.

The preparation process according to the invention may optionally comprise a stage for stabilization of said oxide support, said stabilization stage being performed prior to the linked sequence of the impregnation, drying and calcination stages.

The stabilization stage for the oxide support consists of:

impregnation, preferably dry, of the oxide support, preferably by an aqueous solution of one or more salts of a metal selected from magnesium (Mg), copper (Cu), cobalt (Co), nickel (Ni), tin (Sn), zinc (Zn), lithium (Li), calcium (Ca), cesium (Cs), sodium (Na), iron (Fe) and manganese (Mn), preferably cobalt, nickel, magnesium, calcium and zinc and preferably cobalt, so as to impregnate a metal content of between 1 and 10% by weight with respect to the total mass of the final catalyst, drying of said impregnated oxide support, and calcination of said impregnated and dried oxide support, the calcination operation being implemented in one or two stages.

In a preferred embodiment of the stabilization stage drying of said impregnated oxide support is advantageously performed at a temperature of between 60° C. and 200° C. for a period between half an hour and three hours. In that case the stabilization stage is advantageously performed in an apparatus among the following examples: fluidized bed, rotating furnace, ventilated drying cabinet, fixed bed, etc. . . .

In another preferred embodiment of the stabilization stage the impregnated oxide support is subjected to a rapid drying stage according to the invention. Preferably the impregnated oxide support is entrained by means of a gas, said impregnated oxide support being subjected to a temperature rise ramp of between 250 and 600° C./min, the residence time of said impregnated oxide support in said drying stage being between 1 second and 1 minute. The operating conditions of the drying operation are described more fully hereinafter. In that case the stabilization stage is advantageously performed in the same apparatus as the linked sequence or sequences of the impregnation, drying and calcination stages of the preparation process according to the invention.

In the case where calcination of the dried and impregnated oxide support is carried out in one stage the calcination operation is advantageously performed in air at a temperature of between 700 and 1200° C., preferably between 850 and 1200° C. and preferably between 850 and 900° C. for a period of between 1 hour and 24 h.

In the case where calcination of the dried and impregnated oxide support is carried out in two stages the calcination operation is advantageously performed at a temperature of between 300° C. and 600° C. in air for a period between half an hour and 3 hours, then at a temperature between 700° C. and 1200° C., preferably between 850 and 1200° C. and preferably between 850 and 900° C. for a period of between 1 hour and 24 hours and preferably between 2 hours and 5 hours.

At the end of the stabilization stage the oxide support on which the active phase is deposited comprises a spinel enclosed in an alumina or a silica-alumina, preferably in a silica-alumina. In particular the oxide support of the catalyst is advantageously formed by a simple spinel enclosed in a silica-alumina of type $MAl_2O_4/Al_2O_3.SiO_2$ or a mixed spinel enclosed in a silica-alumina of type $M_xM'_{(1-x)}Al_2O_4/Al_2O_3.SiO_2$ in which M and M' are separate metals selected from the group formed by magnesium (Mg), copper (Cu), cobalt (Co), nickel (Ni), tin (Sn), zinc (Zn), lithium (Li), calcium (Ca), cesium (Cs), sodium (Na), iron (Fe) and manganese (Mn) in which $Al_2O_3.SiO_2$ denotes the chemical formula of a silica-alumina, in which x is between 0 and 1, the values 0 and 1 being themselves excluded.

The stabilized oxide support obtained is formed by a spinel structure which advantageously comprises at least 5% by weight of said spinel structure, preferably at least 10% and still more preferably at least 15% by weight with respect to the total weight of the support. The silica-alumina in which the spinel structure is preferably enclosed preferably comprises 1 to 30% by weight of silica with respect to the total weight of the support. It is homogeneous on the micrometer scale and still more preferably homogeneous on the nanometer scale.

The stabilization stage makes it possible to limit the attacks of the Fischer-Tropsch synthesis reaction medium (water, acids). At the discharge from the stabilization stage the metal from group VIII and preferably the cobalt which is added in that way involves a very strong interaction with the oxide support and cannot therefore be reduced in the Fischer-Tropsch catalyst reduction range which is well known to the man skilled in the art (reduction temperature lower than 550° C.).

In a preferred embodiment the linked sequence of the impregnation, drying and calcination stages of the preparation process according to the invention, preferably in that order, is performed at least twice. In that case the preparation process according to the invention therefore comprises after each impregnation stage a drying stage which is independent of the calcination stage.

The stage for impregnation of the stabilized oxide support is advantageously performed by at least one solution containing at least one precursor of the metal from group VIII. In particular that stage can advantageously be affected by dry impregnation, by impregnation in excess or again by deposit-precipitation using methods well known to the man skilled in the art. Preferably the impregnation stage is carried out by dry impregnation, preferably at ambient temperature and preferably at a temperature equal to 20° C. The impregnation stage involves bringing the oxide support into contact with at least one solution containing at least one precursor of the metal from the group VIII, the volume of which is equal to the pore volume of the support to be impregnated. That solution contains the metallic precursors of the metal or metals from group VIII at the desired concentration to achieve on the final catalyst the desired metal content. The impregnation stage can also advantageously be performed at any other temperature compatible with that technology, preferably between 5° C. and 40° C., preferably between 15° C. and 25° C. and very preferably between 17° C. and 23° C.

In the preferred embodiment in which the linked sequence of the impregnation, drying and calcination stages for the stabilized oxide support, preferably in that order, is performed twice, the first stage for impregnation of the oxide support which is possibly stabilized permits the deposit of 2 to 15% by weight and preferably 5 to 10% by weight of at least one metal from group VIII selected from cobalt, iron and ruthenium and preferably cobalt, with respect to the total mass of the final catalyst. The second stage for impregnation of the oxide support which is possibly stabilized permits the deposit of 2 to 15% by weight and preferably 5 to 10% by weight of at least one metal from group VIII selected from cobalt, iron and ruthenium and preferably cobalt, with respect to the total mass of the final catalyst. In the case where the element from group VIII is cobalt, those two stages permit the deposit of a content of metallic cobalt which can be between 4 and 30% by weight and preferably between 10 and 20% by weight with respect to the total mass of the final catalyst.

The metal or metals from group VIII are brought into contact with the optionally stabilized oxide support by way of any metallic precursor soluble in an aqueous or an organic phase. When it is introduced in an organic solution the precursor of the metal from group VIII is preferably oxalate or acetate of said metal from group VIII. Preferably the precursor of the metal from group VIII is introduced in aqueous solution, preferably in the form of nitrate, carbonate, acetate, chloride, oxalate, complexes formed by a polyacid or an acid-alcohol and its salts, complexes formed with acetyl acetonates, or any other inorganic derivative soluble in aqueous solution, which is brought into contact with said support. In the preferred case where the metal from group VIII is cobalt the cobalt precursor which is advantageously used is cobalt nitrate, cobalt oxalate or cobalt acetate.

The step for impregnation of the optionally stabilized oxide support of the catalyst prepared according to the invention can also advantageously comprise at least one additional stage involving depositing at least one additional metal selected from platinum, palladium, rhenium, rhodium, ruthenium, manganese and tantalum, alone or in the form of a mixture, on said oxide support. Preferably the additional metal is selected from platinum, ruthenium and rhenium and very preferably the additional metal is platinum. Deposit of the additional metal on the support can advantageously be performed by any method known to the man skilled in the art, preferably by impregnation of the oxide support with at least one solution containing at least one precursor of the additional metal and preferably by dry impregnation or by impregnation in excess. The additional metal or metals are preferably present in an amount of 0.01 to 2% by weight, preferably 0.02 to 0.3% by weight of metal with respect to the weight of catalyst.

According to the invention a drying stage, referred to as the rapid drying stage, for the impregnated and optionally previously stabilized oxide support is carried out between the impregnation stage and the calcination stage.

In that drying stage the impregnated oxide support is entrained by means of a gas, said impregnated oxide support being subjected to a temperature rise ramp of between 250 and 600° C./min, preferably between 300 and 600° C./min, preferably between 350 and 600° C./min, more preferably between 350 and 550° C./min, the residence time of the impregnated oxide support in said drying stage being between 1 second and 1 minute, preferably between 5 and 40 seconds and preferably between 5 and 30 seconds.

The drying stage is referred to as the rapid drying stage as the drying mode used makes it possible to achieve a very short contact time between the catalyst and the gas in a very high gas flow rate permitting water to be very rapidly eliminated.

Preferably the gas used in the drying stage is air, alone or mixed with an inert gas.

Preferably the temperature of the gas at the entry to the drying stage is between 300 and 800° C., preferably between 400 and 700° C. and very preferably between 400 and 600° C.

Preferably the pressure in the course of the drying stage is between 0.02 and 0.2 MPa and preferably between 0.05 and 0.1 MPa.

Preferably the drying stage operates in the presence of a gas flow rate of between 2 and 4 Nl/h/g of catalyst, preferably between 2.6 and 3.2 Nl/h/g of catalyst.

During the drying stage the temperature of the oxide support which is impregnated and entrained in the drying stage is between 50 and 60° C. in the preferred temperature and flow rate range.

The drying operation is an important stage in preparation of the catalyst according to the invention. The impregnation, drying and calcination stages are performed independently of each other.

The drying stage makes it possible to entrain an impregnated oxide support powder, which is possibly stabilized, being of a granulometry of less than 200 μm, and with a loss on ignition, LOT, of between 20 and 50% on issuing from the impregnation stage. On issuing from the drying stage the impregnated and dried oxide support is in the form of a powder of a granulometry of less than 200 μm and a loss on ignition measured at 1000° C. (LOT at 1000° C.) of between 7 and 20%.

The drying stage is advantageously carried out in any apparatus known to the man skilled in the art permitting treatment of a powder with an LOI of between 20 and 50%, of a granulometry of less than 300 and making it possible to achieve a very short contact time in a very high air flow rate and at an elevated temperature. Preferably in an apparatus selected from entrained beds and flash driers or in any equivalent apparatuses known to the man skilled in the art. Flash driers are in particular widely used in the field of agri-food and are marketed by companies like Barr-Rosin, Niro but can advantageously be used as driers in the present invention.

The rapid drying stage which is independent of the calcination stage and carried out after said or each impregnation stage of the preparation process according to the invention makes it possible to avoid surface migration of the metal from group VIII and preferably cobalt and also avoids the formation of aggregates of the metal from group VIII and preferably cobalt within the grains of catalyst obtained.

Thus the rapid drying stage performed before the calcination stage in the process according to the invention permits both highly efficient drying and makes it possible to avoid the formation of crust of the metal from group VIII and preferably cobalt at the surface of the particles of the catalyst prepared in that way, and thus makes it possible to improve the distribution of the metal from group VIII and preferably cobalt within the catalyst particles.

According to the invention a stage for calcination of the dried impregnated oxide support is carried out after the impregnation stage. The calcination stage is advantageously performed independently of the rapid drying stage. Preferably the calcination stage is performed in an apparatus selected from a ventilated drying cabinet, a fluidized bed and a rotating furnace, or in any equivalent apparatuses known to the man skilled in the art.

The calcination stage is advantageously carried out at a temperature between 320° C. and 460° C., preferably between 350 and 440° C. and preferably between 360 and 420° C.

It is preferably carried out for a period of between 15 min and 15 h and preferably between 30 min and 12 h and still more preferably between 1 h and 6 h.

The catalyst obtained at the issue from the preparation process according to the invention is in oxide form after the linked sequence of the impregnation, drying and calcination stages which is performed at least once. It has crystallites of oxide of the metal from group VIII which is present in the active phase of the catalyst, preferably crystallites of cobalt oxide $Co_3O_4$.

The preparation process according to the invention may advantageously also comprise at least one stage for reduction of the catalyst obtained, the reduction stage being performed after the linked sequence of the impregnation, drying and calcination stages.

In fact prior to its use in a catalytic reactor for Fischer-Tropsch synthesis the catalyst obtained at the end of the process according to the present invention is preferably subjected to at least one reduction stage. The reduction stage is intended to activate the catalyst and form particles of metal in the zero valent state and is for example performed in pure or dilute hydrogen at high temperature.

When the metal from group VIII used is cobalt the reduction stage makes it possible to carry out the following reaction:

$$Co_3O_4 \rightarrow CoO \rightarrow Co(0)$$

The reduction stage is advantageously implemented at a temperature between 200 and 500° C. and for a period of between 2 and 20 hours.

The reduction stage is advantageously effected either in situ, that is to say in the same reactor as that in which the Fischer-Tropsch reaction is performed, or ex situ before being loaded into the reactor.

The present invention also concerns the catalyst which is capable of being produced by the preparation process according to the invention.

The catalyst obtained at the end of the preparation process according to the invention comprises an active metallic phase comprising at least one metal from group VIII selected from cobalt, nickel, ruthenium and iron, alone or as a mixture, and an oxide support as defined hereinbefore.

The oxide support on which the active phase is deposited may advantageously be of a morphology in the form of powder of a variable granulometry, in particular when the catalyst is used in a reactor of slurry bubble column type. The size of the grains of the catalyst may advantageously be between a few microns and some hundreds of microns. For use in a slurry reactor the size of the particles of the catalyst prepared using the process according to the invention is preferably between 10 microns and 300 microns, very preferably between 20 and 200 microns. The catalyst obtained at the end of the preparation process according to the invention has a mean size of crystallites of metal of group VIII of less than 12 nm.

The catalyst obtained in that way comprises grains in which the metal from group VIII and preferably cobalt is distributed homogeneously in the grains and at their surface, which grains have no or little aggregates of metal from group VIII, the formation of crust at the periphery of the catalyst grains being limited.

The distribution of the metal of group VIII and preferably cobalt in the interior of the grains of catalyst obtained by the process according to the invention and the presence or absence of a layer of metal from group VIII and preferably cobalt which is also referred to as the crust is detected for example by X-microanalysis by electronic probe or by retrodiffused-electron scanning electron microscopy (SEM).

The catalyst obtained at the end of the preparation process according to the invention may advantageously be employed in reactions carried out in suspension in a three-phase fluidized reactor, preferably of bubble column type. In this preferred use of the catalyst the catalyst is divided in the state of very fine powder, in particular of the order of some tens of microns and for example between 5 microns and 300 microns, preferably between 20 microns and 150 microns and still more preferably between 20 and 120 microns. That technology is also known by the terminology of the 'slurry process' by the man skilled in the art.

That catalyst can also be advantageously used in different types of reactors and for example in a fixed bed, in a movable bed, in a bubble column or again in a three-phase fluidized bed.

The invention also concerns a process for Fischer-Tropsch synthesis from a mixture of carbon and hydrogen using a catalyst prepared according to the preparation process according to the invention, the Fischer-Tropsch synthesis process operating at a temperature of between 190 and 240° C. at a total pressure of between 1 and 5 MPa and with an $H_2/CO$ molar ratio of between 1.5 and 2.5.

The invention is illustrated by the following examples.

EXAMPLE 1

Comparative

A catalyst A1 comprising cobalt deposited on a silica-alumina support is prepared by dry impregnation of an aqueous solution of cobalt nitrate so as to deposit in two successive stages of the order of 14% by weight of Co on a commercial silica-alumina powder (SIRALOX® 5/170, SASOL) of a mean granulometry equal to 80 μm, of a surface area of 171 m2/g and a pore volume equal to 0.519 ml/g.

After a first dry impregnation operation the solid is dried in a drying oven at 120° C. for 3 h in an air flow at an uncontrolled flow rate. The temperature is then raised to 420° C. using a 1° C./min ramp in a uncontrolled air flow rate, then a maintenance level of 420° C. for 4 h is applied. The intermediate catalyst contains about 8% by weight of Co. It is subjected to a second dry impregnation stage by means of a solution of cobalt nitrate. The solid obtained is dried in a drying oven at 120° C. for 3 h in an uncontrolled air flow rate. Calcination is then performed at a temperature of 420° C. using a 1° C./min ramp in an uncontrolled air flow rate then a maintenance level of 420° C. for 4 h is applied. The final catalyst A1 is obtained, which contains 13.5% by weight of Co.

Figure 1B:

Retrodiffused-electron scanning electron microscopy (FIG. 1) demonstrates the presence of crust (FIG. 1a) and a poor distribution of the cobalt within the catalyst grains (FIG. 1b).

The mean size of the crystallites of $Co_3O_4$ measured by XRD is 19 nm.

The LOI at 1000° C. of the solid A1 is 13%.

The content of $Co_3O_4$ measured by XRD present in the catalyst after issuing from the drying stage is about 3.5% by weight with respect to the total mass of the sample.

The content of $Co_3O_4$ in the solid at the end of the drying stage is determined by XRD. The area of the lines of $Co_3O_4$ at 36.9° (principal line) and 59.3° was measured. A calibration straight line was implemented by means of reference samples containing 0 and 100% of $Co_3O_4$, which makes it possible to evaluate the $Co_3O_4$ content in a given sample.

EXAMPLE 2

Comparative

A catalyst A2 comprising cobalt deposited on a silica-alumina support is prepared by dry impregnation of an aqueous solution of cobalt nitrate so as to deposit in two successive stages of the order of 13.5% by weight of Co on a commercial silica-alumina powder (SIRALOX® 5/170, SASOL) of a mean granulometry equal to 80 μm, of a surface area of 171 m2/g and a pore volume equal to 0.519 ml/g.

After a first dry impregnation operation the solid is dried in a fluidized bed in a flow of dry air using a ramp of 230° C./min with an air flow rate of 2.11 Nl/h/g of catalyst for a period of 15 s in an air flow. The catalyst is then discharged and then introduced into a ventilated drying cabinet. The temperature is raised to 420° C. with a ramp of IT/min in an uncontrolled air flow rate and then the temperature level of 420° C. is maintained for 4 h. The intermediate catalyst contains about 8% by weight of Co. It is subjected to a second dry impregnation stage by means of a solution of cobalt nitrate. The moist solid is dried in a fluidized bed in a flow of dry air using a ramp of 240° C./min in an air flow rate of 2.11 l/(h·g of catalyst) for a period of 15 s in an air flow. The catalyst is then discharged and then introduced into a ventilated drying cabinet. Calcination is then effected at a temperature of 420° C. using a ramp of 1° C./min in an uncontrolled air flow then the temperature level of 420° C. is maintained for 4 h. The final catalyst A2 is obtained, containing 13.5% by weight of Co.

Figure 2A:
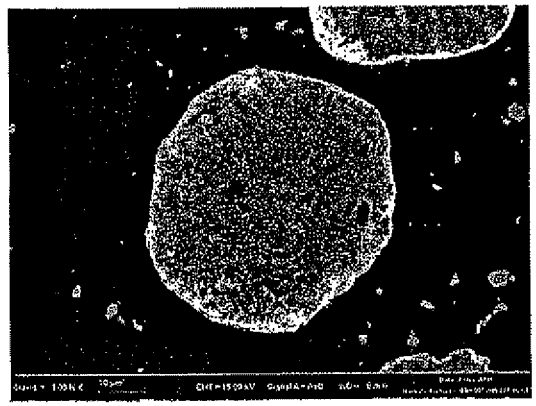
FIGS. 2A and 2B: Reveals the presence of crust (FIG. 2A) and a poor distribution of cobalt within the catalyst grains (FIG. 2B) of comparative Example 2.
Figure 2B:
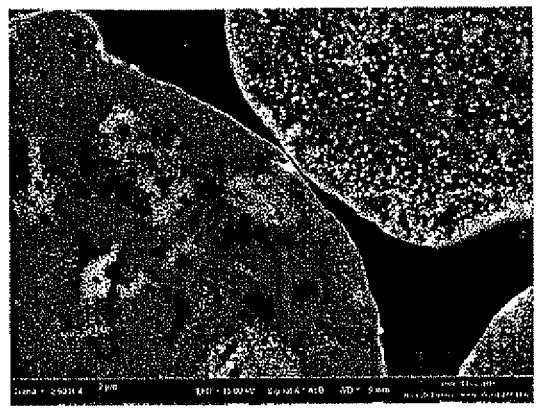

Retrodiffused-electron scanning electron microscopy (FIG. 2) reveals the presence of crust (FIG. 2a) and a poor distribution of cobalt within the catalyst grains (FIG. 2b).

The mean size of crystallites of $Co_3O_4$ measured by XRD is 22 nm.

The LOI at 1000° C. of the solid A2 is 22%.

No trace of $Co_3O_4$ is detected by XRD.

EXAMPLE 3

According to the Invention

A catalyst A3 comprising cobalt deposited on a silica-alumina support is prepared by dry impregnation of an aqueous solution of cobalt nitrate so as to deposit in two successive stages of the order of 13.5% by weight of Co on a commercial silica-alumina powder (SIRALOX® 5/170, SASOL) of a mean granulometry equal to 80 μm, of a surface area of 171 m2/g and a pore volume equal to 0.519 ml/g.

After a first dry impregnation operation the solid is dried in a fluidized bed in a flow of dry air using a ramp of 360° C./min with an air flow rate of 2.63 Nl/h/g of catalyst for a period of 10 s in an air flow. The catalyst is then discharged and then introduced into a ventilated drying cabinet. The temperature is raised to 420° C. with a ramp of loC/min in an uncontrolled air flow rate and then the temperature level of 420° C. is maintained for 4 h. The intermediate catalyst contains about 8% by weight of Co. It is subjected to a second dry impregnation stage by means of a solution of cobalt nitrate. The moist solid is dried in a fluidized bed in a flow of dry air using a ramp of 360° C./min in an air flow rate of 2.63 Nl/h/g of catalyst for a period of 10 s in an air flow. The catalyst is then discharged and then introduced into a ventilated drying cabinet. Calcination is then effected at a temperature of 420° C. using a ramp of 1° C./min in an uncontrolled air flow then the temperature level of 420° C. is maintained for 4 h. The final catalyst A3 is obtained, containing 13.5% by weight of Co.

Figure 3A:
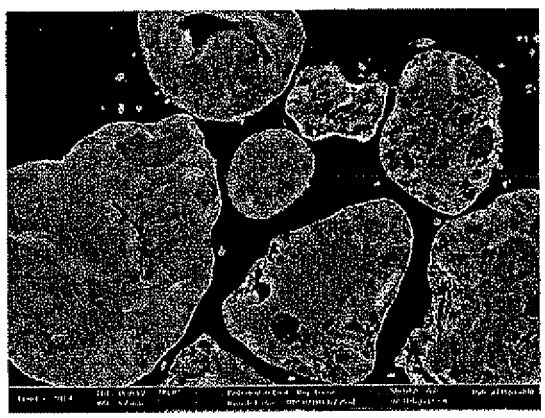
FIGS. 3A and 3B: Reveals the absence of crust (FIG. 3A) and the absence of cobalt aggregates within the catalyst grains (good cobalt distribution within the catalyst grains) (FIG. 3B) of Example 3.
Figure 3B:
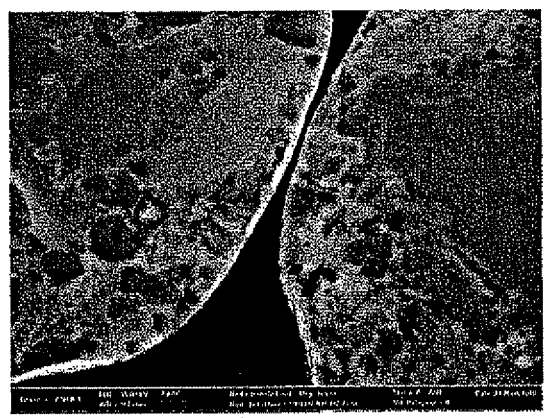

Retrodiffused-electron scanning electron microscopy (FIG. 3) reveals the absence of crust (FIG. 3a) and the absence of cobalt aggregates within the catalyst grain (good cobalt distribution within the catalyst grains) (FIG. 3b).

The mean size of crystallites of $Co_3O_4$ measured by XRD is 12 nm.

The LOI at 1000° C. of the solid A3 is 10%.

No trace of $Co_3O_4$ is detected by XRD.

EXAMPLE 4

According to the Invention

A plurality of catalysts are prepared in an identical fashion to the catalyst of Example 3 except for the difference that the entry temperature of the gas into the drying stage is varied between 400 and 550° C.

Figure 4:
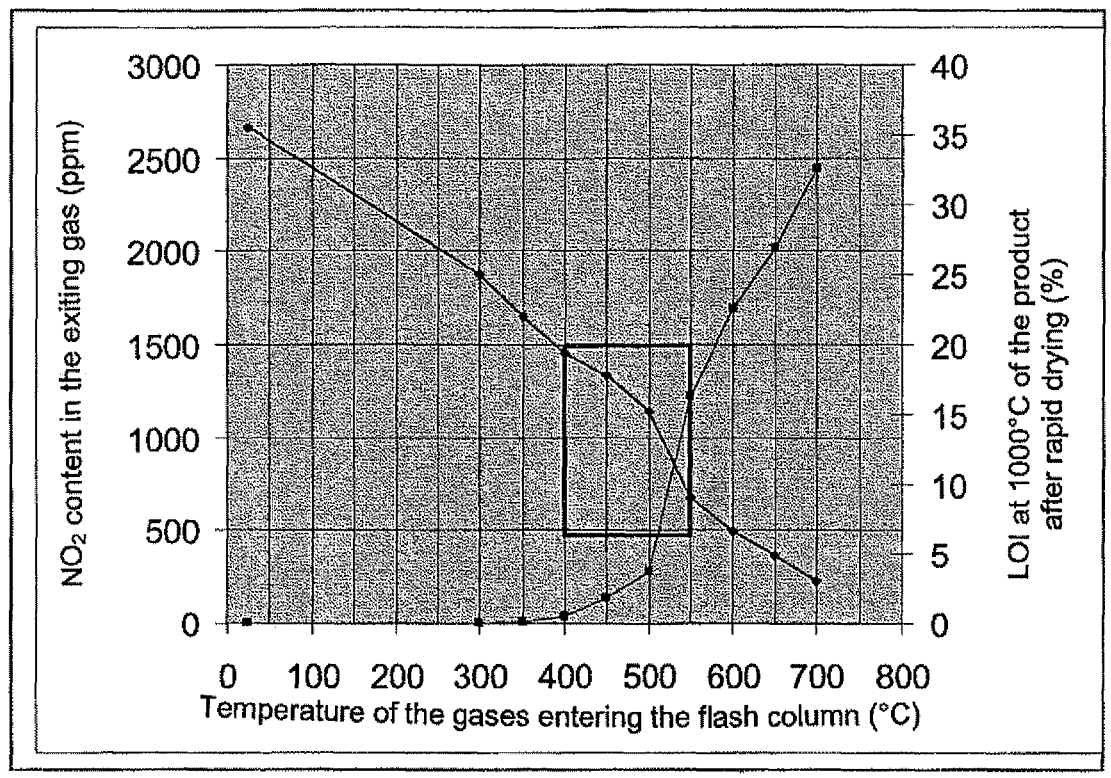
FIG. 4: Shows the LOI and $NO_2$ content results of Example 4.

FIG. 4 shows the variation in the LOI at 1000° C. on issuing from the drying operation and the NO2 content in the gas issuing from the flash column of the drying stage in dependence on the temperature of the gases entering the drying stage for catalysts prepared in accordance with Example 3 with 13.5% by weight of Co. For different entry gas temperatures catalyst sampling was affected, which made it possible to determine the residual loss on ignition after drying. The range involved corresponds to catalysts of the preferred range for which very good distribution of cobalt in the catalyst grains is obtained, while not causing substantial decomposition of the nitrates present. The presence of NO2, without this being linked to any theory, is tied to the surface fraction of the grains of catalyst in contact with the hot drying gas.

EXAMPLE 5

The catalysts A1, A2 and A3 before being successively tested in respect of conversion of the synthesis gas are reduced ex situ in a flow of pure hydrogen at 400° C. for a period of 16 hours in a tubular reactor. Once the catalyst is reduced it is discharged in an argon atmosphere and encased in some Sasolwax® to be stored sheltered from air prior to the test. The Fischer-Tropsch synthesis reaction is carried out in a reactor of slurry type which functions continuously and which operates with a concentration of 10% (vol) of catalyst in the slurry phase.

Each of the catalysts is in the form of powder of a diameter of between 40 and 150 microns.

The test conditions are as follows:
Temperature=230° C.
Total pressure=2 MPa
$H_2$/CO molar ratio=2.

The conversion of CO is maintained at between 45 and 50%.

The test conditions are adjusted so as to be at iso conversion of CO, irrespective of the activity of the catalyst.

Activity is calculated in the following fashion:

$$\text{Activity} = \exp\left(\frac{-E}{RT_{base}}\right) \cdot \exp\left(\frac{E}{RT_{ref}}\right)$$

with $T_{base}$=225° C.
E=activation energy
R=constant of the completed gases
$T_{ref}$=T of a reference catalyst.

For a reference catalyst the activity is 100%, the reference temperature is then equal to the base temperature.

The results are calculated for the catalysts A1, A2 and A3 with respect to the reference catalyst involving an activity of 100% and are set out in Table 1 below. The alpha paraffin selectivities are given as well as the selectivity in respect of $C_{5+}$ compounds.

Measurement of the selectivity in respect of alpha paraffin is implemented by way of an analysis by gaseous phase chromatography of the effluents from the reaction, metering of the paraffins and calculation of the slope of the log curve mol (%)=f (carbon number) which corresponds to the alpha.

| | Catalyst | | |
|---|---|---|---|
| | A1 | A2 | A3 |
| LOI at 1000° C. after drying (%) | 13% | 22% | 10% |
| CO$_3$O$_4$ after drying by XRD (%) | 3.5 | 0 | 0 |
| Activity after 300 h (%) | 230 | 230 | 300 |
| Selectivity C5+ (%) | 80 | 79 | 82 |
| Selectivity alpha paraffins | 0.878 | 0.872 | 0.892 |

The activity of the activity A3 according to the invention is improved by 70 points with respect to the activity of the catalysts A1 and A2 (300% with respect to 230%). Its selectivity in respect of C$_{5+}$, alpha paraffins is also better than that of the catalyst A1 and the catalyst A2. The process of the invention thus makes it possible to produce a catalyst with very little crust (not visible in SEM) and no aggregates, being both more active and more selective.

The entire disclosures of all applications, patents and publications, cited herein and of corresponding application No. FR1201543, filed May 30, 2012 are incorporated by reference herein in their entirety.

The invention claimed is:

1. A process for the preparation of a catalyst comprising an active phase comprising at least one metal from group VIII selected from cobalt, nickel, ruthenium, iron, and mixtures thereof, and an oxide support, said process comprising the following in sequence:
impregnating an oxide support with at least one solution containing at least one precursor of cobalt, nickel, ruthenium, or iron,
rapidly drying the impregnated oxide support in a rapid drying stage by entraining said impregnated oxide support in a gas and subjecting said impregnated oxide support to a temperature rise ramp of between 250 and 600° C./min, wherein the residence time of said impregnated oxide support in said rapid drying stage is between 1 second and 1 minute, and
calcining the impregnated and dried oxide support.

2. A process according to claim 1, wherein the sequence of impregnating, rapid drying and calcining, in that order, is performed at least twice.

3. A process according to claim 1, wherein said active phase comprises cobalt.

4. A process according to claim 1, wherein said oxide support of the catalyst is selected from alumina, silica, titanium oxide, ceric oxide, zirconia, and mixtures thereof.

5. A process according to claim 4, wherein said oxide support is silica-alumina.

6. The process according to claim 5, wherein said oxide support 1 to 30% by weight silica with respect to the total weight of the oxide support.

7. A process according to claim 1, wherein the gas used in said rapid drying stage is air alone or a mixture of air and an inert gas.

8. A process according to claim 1, wherein the temperature of the gas at the entry to said rapid drying stage is between 300 and 800° C.

9. A process according to claim 1, wherein said calcining is carried out in an apparatus selected from a ventilated drying cabinet, a fluidized bed, and a rotating furnace.

10. A process according to claim 1, wherein said calcining is carried out at a temperature of between 320° C. and 460° C. and for a period of between 15 min and 15 h.

11. A process according to claim 1, wherein said process further comprises a stage for stabilization of said oxide support, said stabilization stage being carried out prior to the sequence of impregnating, rapid drying and calcining.

12. A process according to claim 11, wherein said stage for stabilization of said oxide support consists of:
impregnating said oxide support with an aqueous solution of one or more salts of a metal selected from magnesium, copper, cobalt, nickel, tin, zinc, lithium, calcium, cesium, sodium, iron and manganese,
drying of the impregnated oxide support, and
calcining the dried impregnated oxide support, wherein calcining is performed in one or two stages.

13. A process according to claim 12, wherein, in said drying of the stabilization stage, the impregnated oxide support is entrained by means of a gas and subjected to a temperature rise ramp of between 250 and 600° C./min, wherein the residence time of said impregnated oxide support in said drying of the stabilization stage is between 1 second and 1 minute.

14. A process according to claim 12, wherein, in the stabilization stage, said calcining of the dried impregnated oxide support is performed in one stage in air at a temperature of between 700 and 1200° C. for a period of between 1 hour and 24 h.

15. A process according to claim 12, wherein, the stabilization stage, said calcining of the dried impregnated oxide support is performed in in a first stage at a temperature of between 300° C. and 600° C. in air for a period of between half an hour and three hours, and then in a second stage at a temperature of between 700° C. and 1200° C. for a period of between 1 hour and 24 h.

16. A process according to claim 12, wherein, in said stage for stabilization, impregnating of said oxide support is performed by dry impregnation.

17. A process according to claim 12, wherein, in said stage for stabilization, impregnating of said oxide support is performed by using an aqueous solution of one or more salts of a metal selected from cobalt, nickel, magnesium, calcium and zinc to impregnate a content of metal of between 1 and 10% by weight with respect to the total mass of the final catalyst.

18. The process according to claim 12, wherein, in the stabilization stage, said drying of the impregnated oxide support is performed at a temperature of between 60° C. and 200° C. for a period between half an hour and three hours.

19. The process according to claim 1, wherein in said rapid drying stage said impregnated oxide support is subjected to a temperature rise ramp between 300 and 600° C./min, and the residence time of said impregnated oxide support in said drying stage is between 5 and 40 seconds.

20. The process according to claim 1, wherein in said rapid drying stage said impregnated oxide support is subjected to a temperature rise ramp between 350 and 600° C./min, and the residence time of said impregnated oxide support in said drying stage is between 5 and 30 seconds.

21. The process according to claim 20, wherein in said rapid drying stage said impregnated oxide support is subjected to a temperature rise ramp between 350 and 550° C./min.

22. A process according to claim 1, wherein said oxide support of the catalyst is alumina, silica, titanium oxide, ceric oxide, or zirconia.

23. The process according to claim 1, wherein the mean size of crystallites of said metal selected from cobalt, nickel, ruthenium, and iron, and mixtures thereof is less than 12 nm in said catalyst.

24. The process according to claim 1, wherein the impregnated and dried oxide support obtained by rapidly drying the impregnated oxide support has a loss on ignition (LOT) at 1000° C. of between 7 and 20%.

25. The process according to claim 1, wherein said catalyst contains cobalt, nickel, ruthenium or iron in an amount between 1 and 60% by weight with respect to the weight of catalyst.

26. The process according to claim 1, further comprising said impregnating said oxide support with at least one solution containing at least one precursor of an additional metal, wherein said additional metal selected from platinum, palladium, rhenium, ruthenium, manganese, and tantalum, and said catalyst contains said least one additional metal in an amount of from 0.01 to 2% by weight with respect to the weight of the catalyst.

27. The process according to claim 1, wherein said rapid drying stage is conducted at a pressure between 0.02 and 0.2 MPa.

28. The process according to claim 1, wherein said rapid drying stage is conducted at a gas flow rate of between 2 and 4 Nl/h/g of catalyst.

* * * * *